(12) United States Patent
Cui et al.

(10) Patent No.: US 10,823,874 B2
(45) Date of Patent: Nov. 3, 2020

(54) SECURITY INSPECTION EQUIPMENT AND RADIATION DETECTION METHOD

(71) Applicant: NUCTECH COMPANY LIMITED, Beijing (CN)

(72) Inventors: Jin Cui, Beijing (CN); Dong Lin, Beijing (CN); Bin Hu, Beijing (CN); Xianshun Tan, Beijing (CN); Hong Wang, Beijing (CN)

( * ) Notice: Subject to any disclaimer, the term of this patent is extended or adjusted under 35 U.S.C. 154(b) by 32 days.

(21) Appl. No.: 15/740,814

(22) PCT Filed: Aug. 8, 2016

(86) PCT No.: PCT/CN2016/093889
§ 371 (c)(1),
(2) Date: Dec. 29, 2017

(87) PCT Pub. No.: WO2017/092395
PCT Pub. Date: Jun. 8, 2017

(65) Prior Publication Data
US 2018/0259673 A1    Sep. 13, 2018

(30) Foreign Application Priority Data
Dec. 4, 2015 (CN) .......................... 2015 1 0885398

(51) Int. Cl.
*G01N 23/12* (2018.01)
*G01V 5/00* (2006.01)

(52) U.S. Cl.
CPC ........... *G01V 5/0025* (2013.01); *G01N 23/12* (2013.01); *G01V 5/0041* (2013.01)

(58) Field of Classification Search
CPC ..... G01V 5/0025; G01V 5/0041; G01N 23/12
See application file for complete search history.

(56) References Cited

U.S. PATENT DOCUMENTS 4,064,440 A    12/1977 Roder
4,472,822 A *    9/1984 Swift ................. A61B 6/032
378/10

(Continued)

FOREIGN PATENT DOCUMENTS

CN    101509880 A    8/2009
CN    102012527 A    4/2011
(Continued)

OTHER PUBLICATIONS

JP Office Action dated Nov. 20, 2018 in the corresponding JP applictaion (application No. 2017-567657).

*Primary Examiner* — Christine S. Kim
(74) *Attorney, Agent, or Firm* — Kilpatrick Townsend & Stockton, LLP

(57) ABSTRACT

The present disclosure proposes a security inspection equipment and a radiation detection method, and relates to the field of security inspection. The security inspection equipment according to the present disclosure includes: a ray emitter; and a radiation detector comprising a forescatter detector, the forescatter detector and the ray emitter located on opposite sides of an object to be detected; wherein the radiation detector further comprises at least one of the following detectors: a backscatter detector located between the ray emitter and the object to be detected; or a transmission detector wherein the transmission detector and the ray emitter located on opposite sides of an object to be detected. Such a security inspection equipment has a forescatter detector, which can be used in combination with backscatter detector, to reduce detection dead angles.

14 Claims, 5 Drawing Sheets

(56) References Cited

U.S. PATENT DOCUMENTS

| | | | | |
|---|---|---|---|---|
| 5,022,062 | A | * | 6/1991 | Annis .................. G01N 23/203 378/57 |
| 5,764,683 | A | * | 6/1998 | Swift ..................... G01N 23/04 378/196 |
| 6,661,867 | B2 | * | 12/2003 | Mario .................. G01N 23/046 250/367 |
| 7,505,556 | B2 | | 3/2009 | Chalmers et al. |
| 2001/0016028 | A1 | * | 8/2001 | Adams ................. G01N 23/203 378/90 |

FOREIGN PATENT DOCUMENTS

| | | |
|---|---|---|
| CN | 202870001 U | 4/2013 |
| CN | 202929217 U | 5/2013 |
| CN | 203191332 U | 9/2013 |
| CN | 103604819 A | 2/2014 |
| CN | 103728326 A | 4/2014 |
| CN | 103608739 A | 5/2014 |
| CN | 103776848 A | 5/2014 |
| CN | 105301669 A | 2/2016 |
| CN | 205374342 U | 7/2016 |
| JP | S6325537 A | 2/1988 |
| WO | 2015014225 A1 | 2/2015 |

* cited by examiner

SECURITY INSPECTION EQUIPMENT AND RADIATION DETECTION METHOD

CROSS-REFERENCE TO RELATED APPLICATION

This application is a national phase entry under 35 USC § 371 of International Application PCT/CN2016/093889, filed Aug. 8, 2016, which claims priority to and benefits of Chinese Patent Applications Serial No. 201510885398.6, filed with the State Intellectual Property Office of P. R. China on Dec. 4, 2015, the entire contents of which are incorporated herein by reference.

TECHNICAL FIELD

The present disclosure relates to the field of security inspection, and particularly to a security inspection equipment and a radiation detection method.

BACKGROUND

With the development of science and technology, the security inspection equipment is widely used in airports, customs, subways and the like at present. For highway security inspection, a X-ray transmission equipment is often utilized for scanning items, in which X-rays emitted from a X-ray source form a scanning sector through a collimator, and a detector receives the X-rays that irradiate the detected item, and through processing, gets internal information of the detected item. This type of security inspection mode is widely used, has a simple structure, is easy to operate, but due to the use of X-ray transmission principle for imaging, it is difficult to detect substances with a low density, e.g., explosives, drugs and so on.

However, X-ray backscattering technique can well inspect substances with a low density. The existing X-ray backscattering inspection equipment has a flywheel which rotates about a center of a target of the ray source to form a pencil beam, and the pencil beam falls over the inspected object to form a flying spot. The backscatter detector collects the X-ray backscattered rays at any time, and after processing, gets the substance information, and after continuous scanning, it can handle and obtain internal information of the entire inspected item, and particularly it can highlight information of substances with a low atomic number, such as explosives, drugs. In this technology, since the imaging principle of the device is to absorb the backscattered X-rays for imaging, it is not effectively to inspect explosives or drugs hidden behind secret substances: if explosives are placed behind a steel plate, the backscattered X-rays are blocked by the steel plate and cannot reach the backscatter detector; it is not effectively to display metal weapons too. Moreover, one-sided backscattering imaging result is poor to the observation of the internal information on the opposite side of the inspected item, and in order to effectively observe both sides of the inspected item, twice inspections are required, which is comparatively cumbersome.

SUMMARY

An objective of the present disclosure is to provide a more reliable security inspection equipment.

According to an aspect of the present disclosure, a security inspection equipment is proposed comprising: a ray emitter; and a radiation detector comprising a forescatter detector located on an opposite side of an object to be detected relative to the ray emitter; wherein the radiation detector further comprises at least one of the following detectors: a backscatter detector located between the ray emitter and the object to be detected; or a transmission detector located on an opposite side of the object to be detected relative to the ray emitter.

Alternatively, the ray emitter is used for emitting a fan beam of rays and a flying spot beam of rays.

Alternatively, the ray emitter comprises: a ray source located at a center of the ray emitter; and a space modulator located between the ray source and the backscatter detector, the space modulator comprising a fixed shielding plate, and a rotary shield between the object to be detected and the fixed shielding plate.

Alternatively, the rotary shield comprises more than one slot and more than one throughhole.

Alternatively, the transmission detector comprises a plurality of detector modules, wherein an angle of placement of each of the detector modules is adapted to a ray incident direction depending on a location of the each detector module in the transmission detector.

Alternatively, the angle of placement of the detector module adapted to a ray incident direction comprises: a detection surface of the detector module is perpendicular to the ray incident direction.

Alternatively, the transmission detector comprises a plurality of detector units consisting of a predetermined number of detector modules arranged in parallel; the angle of placement of each of the detector modules adapted to the ray incident direction depending on a different location of each of the detector modules in the transmission detector comprising: depending on a location of each of the detector units in the transmission detector, a direction of the detection surface of the each detector unit is adapted to the ray incident direction.

Alternatively, the transmission detector is of an arc shape protruding toward an opposite side of the object to be detected or of a flat plate shape.

Alternatively, the security inspection equipment further comprises a transportation facility for carrying and moving the ray emitter and the radiation detector.

Alternatively, the security inspection equipment further comprises a cantilever, one end of the cantilever connected to the transmission detector and the forescatter detector, and the other end of the cantilever connected to the transportation facility; wherein the transportation facility carries the ray emitter inside and a side surface of the transportation facility is connected to the backscatter detector.

Alternatively, the cantilever comprises a folding mechanism and a rotating mechanism for folding and rotating the cantilever.

Alternatively, the security inspection equipment further comprises a processor configured to receive detection signals from the forescatter detector, the backscatter detector, and the transmission detector, and analyze the objects to be detected.

Alternatively, the security inspection equipment further comprises a controller configured to control folding and rotation of the cantilever.

Such a security inspection equipment has a forescatter detector, which can be used in combination with backscatter detector, to reduce detection dead angles, and thus the detection of the internal information on the opposite side of the ray source can be optimized; the forescatter detector can be used in combination with the transmission detector, and thus a simultaneous detection of high-density and low-density substances can be realized; the forescatter detector can be used in combination with the backscatter detector and the transmission detector, and thus a simultaneous detection of high-density and low-density substances can be realized while the detection dead angles is reduced, the detection effect of the object to be detected can be further optimized, and the detection accuracy can be improved.

According to another aspect of the disclosure, a ray detection method is proposed, comprising: emitting a fan beam of rays and a flying spot beam of rays to an object to be detected by using a ray emitter; acquiring detection data by a radiation detector comprising: acquiring fore-scattering data of the object to be detected by a forescatter detector; and at least one of following two steps: acquiring transmission data of the object to be detected by a transmission detector; or acquiring backscattering data of the object to be detected by a backscatter detector; and acquiring detection information based on the fore-scattering data, and at least one of the backscattering data or the transmission data.

Alternatively, emitting a fan beam of rays and a flying spot beam of rays to an object to be detected by using a ray emitter comprises: emitting rays to the object to be detected by using a ray emitter which alternately emits a fan beam of rays and a flying spot beam of rays.

Alternatively, the ray detection method further comprises: displaying a detection image according to the detection information.

Alternatively, the ray detection method further comprises: marking a prohibited object in the object to be detected or alarming according to the detection information.

In this way, the fore-scattering data in combination with the backscattering data are acquired, which can be use to reduce detection dead angles, and thus the detection of the internal information on the opposite side of the ray source can be optimized; the fore-scattering data in combination with the transmission data are acquired, and thus a simultaneous detection of high-density and low-density substances can be realized; the fore-scattering data, the backscattering data and the transmission data can be taken into comprehensive consideration, and thus a simultaneous detection of high-density and low-density substances can be realized while the detection dead angles can be reduced. In this way, the detection effect of the object to be detected is optimized and the detection accuracy is improved.

BRIEF DESCRIPTION OF DRAWINGS

The accompanying drawings illustrated herein are used for providing a further understanding of the present disclosure, and constitute a part of the present application. The illustrative embodiments of the present disclosure and descriptions thereof are merely used for explaining the present disclosure and but cannot be regarded as inappropriate limitations to the present disclosure. In the accompanying drawings.

DETAILED DESCRIPTION

The technical solutions of the present disclosure will be further described in detail below through accompanying drawings and embodiments.

Figure 1:
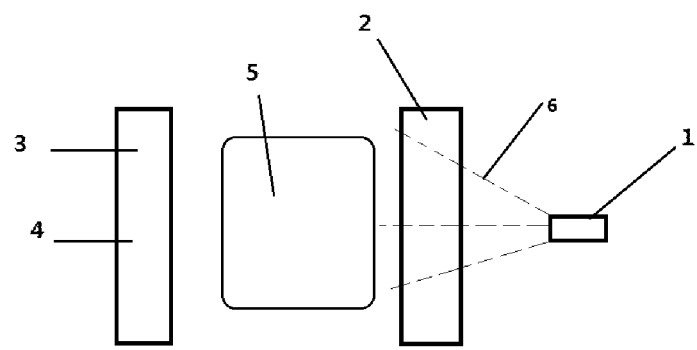
FIG. 1 is a schematic diagram showing an embodiment of a security inspection equipment according to the present disclosure.

FIG. 1 is a schematic diagram showing an embodiment of a security inspection equipment according to the present disclosure. As shown in FIG. 1, a ray emitter 1 emits rays 6 to an object 5 to be detected. A radiation detector of the security inspection equipment comprises a forescatter detector 4 located on an opposite side of the object 5 to be detected relative to the ray emitter 1, capable of acquiring fore-scattering data. The radiation detector may further comprise: a transmission detector 3 located on an opposite side of the object to be detected relative to the ray emitter, capable of acquiring transmission data. The radiation detector may further comprise a backscatter detector 2 located between the object 5 to be detected and the ray emitter 1, capable of acquiring backscattering data.

Such a security inspection equipment has a forescatter detector, which can be used in combination with backscatter detector to reduce detection dead angles, and thus the detection of the internal information on the opposite side of the ray source can be optimized; the forescatter detector can be used in combination with the transmission detector, and thus a simultaneous detection of high-density and low-density substances can be realized; the forescatter detector can be used in combination with the backscatter detector and the transmission detector, and thus a simultaneous detection of high-density and low-density substances can be realized while the detection dead angles can be reduced, the detection effect of the object to be detected can be further optimized and the detection accuracy can be improved.

In an embodiment, the ray emitter can emit a fan beam of rays and a flying spot beam of rays. The fan beam of rays passes through the object to be detected to the transmission detector such that the transmission detector can acquire the transmission data. The flying spot beam of rays, after being scattered by the object to be detected, reaches the forescatter detector and the backscatter detector, so as to acquire the fore-scattering data and the backscattering data.

Such a security inspection equipment can emit two kinds of beams of rays, which are supplied to the transmission detector and the scattering detector respectively to acquire the transmission data and the scattering data, therefore, the detection speed is increased and the detection effect is optimized.

Figure 2:
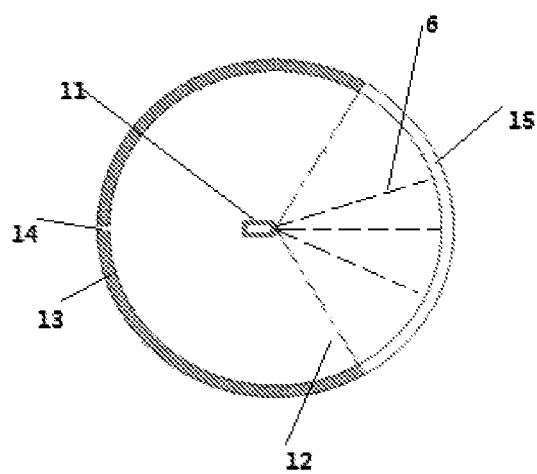
FIG. 2 is a schematic diagram showing an embodiment of a ray emitter in the security inspection equipment according to the present disclosure.

FIG. 2 is a schematic diagram showing a ray emitter in the security inspection equipment according to the present disclosure, wherein a ray source 11 is located in a center of the ray emitter, for emitting rays towards the object to be detected. The ray emitter further comprises: a space modulator located between the ray source and the backscatter detector, capable of adjusting the rays emitted by the ray source 11, to thereby control the rays emitted by the ray emitter. In an embodiment, the space modulator comprises a fixed shielding plate 12 and a rotary shield 13, wherein the fixed shielding plate 12 causes the rays emitted by the ray source 11 to emit in a predetermined direction with a predetermined angle, wherein the predetermined angle may be 120 degrees, and the rotary shield is located between the object to be detected and the fixed shielding plate. The rotary shield comprises a slot 15 and a throughhole 14, and the rotary shield rotates at a predetermined rate. When the rays pass through the throughhole 14, a flying spot beam of rays is formed; when the rays pass through the slot 15, a fan beam of rays is formed. The rays emitted from the ray emitter vary with time. In an embodiment, the rotary shield comprises more than one slot and more than one throughhole. The number of slots and throughholes can be set as needed.

By using such a security inspection equipment, the ray emitter can periodically form fan beams of rays and flying spot beams of rays, respectively for transmission detection and scattering detection, that is, a single ray emitter may be used for realizing emission of two kinds of beams of rays, which reduces the volume of the security inspection equipment and creates conditions for simultaneous acquisition of the transmission data and the scattering data.

In an embodiment, the transmission detector according to the present disclosure comprises a plurality of detector modules, wherein depending on a different location of each detector module in the transmission detector, an angle of placement of each detector module is adapted to a ray incident direction. In an embodiment, a detection surface of the detector module is adjusted to be perpendicular to the ray incident direction. Such a transmission detector is different from previous detector modules which were arranged in order and in parallel, and by placing different detector modules in different angles of placement, rays passing through the object to be detected can be better received such that detection dead angles can be reduced.

Figure 3A:
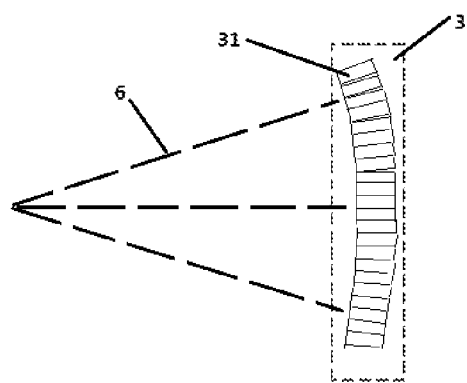
FIG. 3A is a schematic diagram showing an embodiment of a transmission detector according to the present disclosure.

In an embodiment, the schematic diagram of the transmission detector is shown in FIG. 3A. The rays 6 pass through the object to be detected and reach the transmission detector 3. the transmission detector 3 of a flat plate type comprises a plurality of detector modules 31, and detector modules 31 are tilted in different angles depending on their height and location. Such a transmission detector is of a flat plate type as a whole for the convenience of installation, and since the angle of the transmission detector can be adjusted internally by adjusting the detector module as a unit, the detection dead angles can be reduced as far as possible.

Figure 3B:
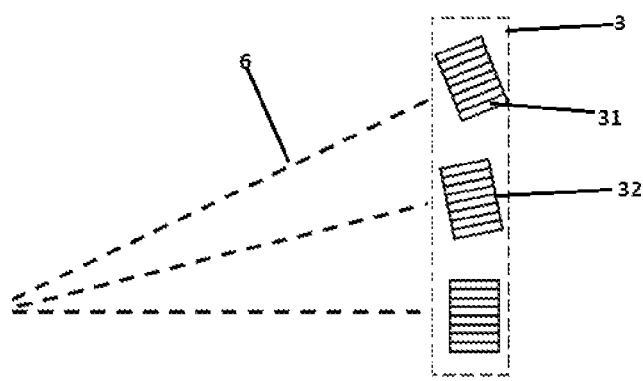
FIG. 3B is a schematic diagram showing another embodiment of a transmission detector according to the present disclosure.

In an embodiment, the schematic diagram of the transmission detector is shown in FIG. 3B. The transmission detector 3 comprises a plurality of detector units 32 consisting of several detector modules 31 arranged in parallel. The detector modules 31 in each detector unit 32 are tilted in a same angle, but depending on a different location and height of the detector unit, detector units are tilted in different angles. Such a transmission detector as a whole is of a flat plate type for the convenience of installation, and because of adjusting the angle of the transmission detector internally by adjusting the detector unit as a unit, the installation and adjustment of the transmission detector are facilitated.

Figure 3C:
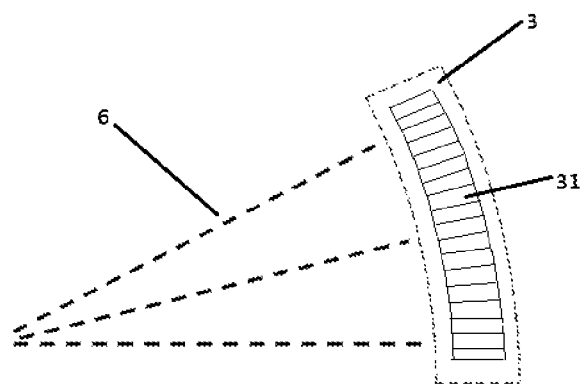
FIG. 3C is a schematic diagram showing a further embodiment of a transmission detector according to the present disclosure.

In an embodiment, the schematic diagram of the transmission detector is shown in FIG. 3C. The transmission detector 3 as a whole is of an arc shape, protrudes toward an opposite side of the object to be detected, and internally includes a plurality of detector modules 31. Such a transmission detector can reduce a distance difference of the rays passing through the surface of the transmission detector to the detector module, thereby the detection accuracy can be improved.

Figure 3D:
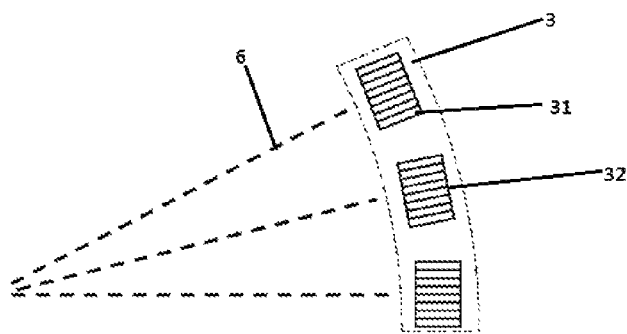
FIG. 3D is a schematic diagram showing a further again embodiment of a transmission detector according to the present disclosure.

In an embodiment, the schematic diagram of the transmission detector is shown in FIG. 3D. The transmission detector 3 as a whole is of an arc shape, protrudes toward the opposite side of the object to be detected, and internally includes a plurality of detector units 32 consisting of several detector modules 31 arranged in parallel. The detector modules 31 in each detector unit 32 are tilted in a same angle, but depending on a different location and height of the detector unit, detector units are tilted in a different angle. Such a transmission detector can reduce a distance difference of the rays passing through the transmission detector to the detector module, thereby the detection accuracy can be improved, and the installation and adjustment of the transmission detector are facilitated by adjusting the angle internally with the detector unit as a unit.

Figure 4:
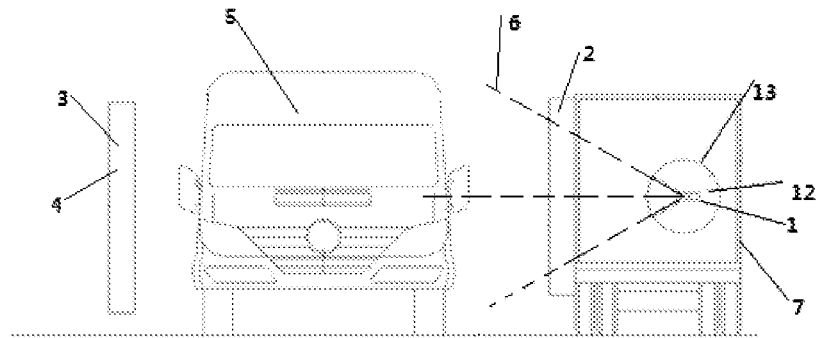
FIG. 4 is a schematic diagram showing another embodiment of a security inspection equipment according to the present disclosure.

FIG. 4 is a schematic diagram showing another embodiment of the security inspection equipment of the present disclosure. The forescatter detector 2 and the ray emitter are installed or placed in a transportation facility 7. Such a security inspection equipment has a small footprint, is easy to transport, is more flexible, and can be flexibly scheduled to cope with some emergencies.

Figure 5:
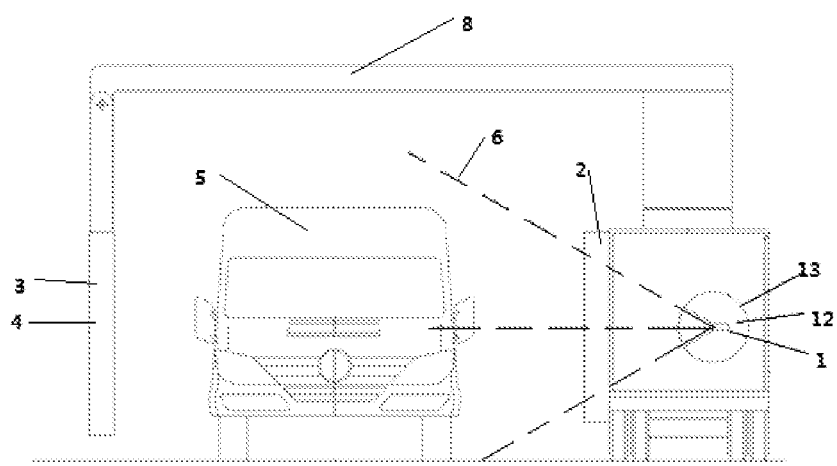
FIG. 5 is a schematic diagram showing a further embodiment of a security inspection equipment according to the present disclosure.

FIG. 5 is a schematic diagram showing a further embodiment of the security inspection equipment of the present disclosure. The security inspection equipment further comprises a cantilever 8, one end of the cantilever connected to the transmission detector and the forescatter detector, and the other end of the cantilever connected to the transportation facility; wherein the transportation facility carries the ray emitter inside and a side surface of the transportation facility facing the object to be detected has a backscatter detector.

Such a security inspection equipment is fully carried by the transportation facility, and thus is more conveniently transported and flexible scheduled; for some objects to be detected that are large and difficult to move, the objects can be detected by moving the transportation facility, thereby the volume of the security inspection equipment can be reduced and the usage scenarios of the equipment can be expanded.

In an embodiment, the cantilever 8 comprises a folding mechanism and a rotating mechanism for folding and rotating the cantilever. By means of such a structure, the security inspection equipment, on the one hand, can fold and rotate the cantilever to the same direction as the vehicle drive while moving the equipment, for the convenience of transportation and second deployment, and on the other hand, the security inspection equipment can adjust a telescopic length of the cantilever according to the usage scenarios, which expands the usage scenarios of the security inspection equipment. Such a security inspection equipment is adaptive to be deployed in important large, medium and small-sized security sites and temporary sites, can continuously scan a number of objects to be detected in a longer distance, has a high throughput and fast detection speed, can be flexibly scheduled to cope with some emergencies, and can simultaneously detect a variety of prohibited items including metal weapons, explosives, drugs.

In an embodiment, the security inspection equipment may comprise a controller configured to control folding and rotation of the cantilever. The controller can be located in the transportation facility, and control the rotation and folding of the cantilever through a wired signal or a wireless signal.

Such security inspection equipment can control the rotation and folding of the cantilever through the controller, and the operation is made more convenient and friendly.

In an embodiment, the security inspection equipment may further comprise a processor for processing detection data from the forescatter detector, the backscatter detector, and the transmission detector. The processor can generate a detection image from the detection data and show it to an operator; the processor can also identify dangerous substances according to the detection results, and make corresponding marking or warning. In an embodiment, the processor may be a computer. The processor can be installed in the transportation facility, and acquire detection data of the transmission detector through a wired signal or a wireless signal. Such security inspection equipment has a processor which can process the detection data in real time, thus dangerous and prohibited items are detected more quickly, and security is improved.

Figure 6:
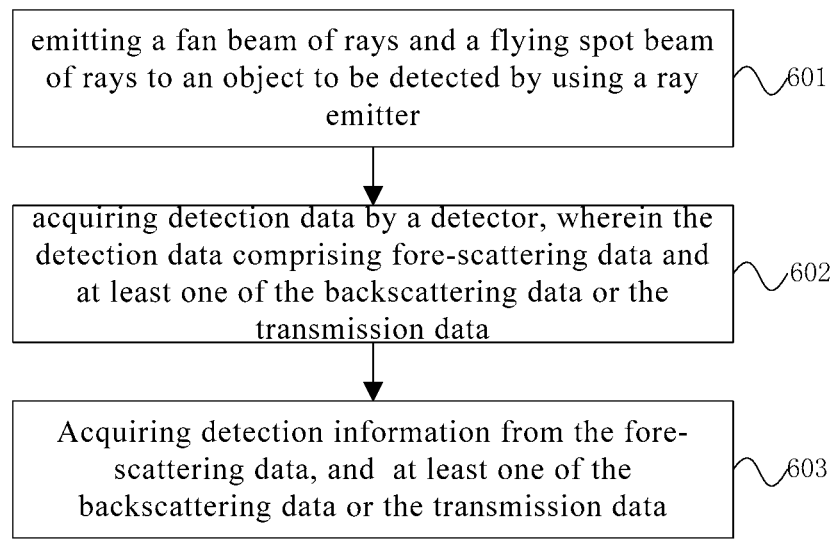
FIG. 6 is a schematic diagram showing an embodiment of a ray detection method according to the present disclosure.

A flowchart of a ray detection method according to an embodiment of the present disclosure is shown in FIG. 6, comprising:

a step 601 of emitting a fan beam of rays and a flying spot beam of rays to an object to be detected by using a ray emitter;

a step 602 of acquiring detection data by a radiation detector, wherein the detection data comprising fore-scattering data and at least one of the backscattering data or the transmission data; and a step 603 of acquiring detection information by analyzing the fore-scattering data, and at least one of the back-scattering data or the transmission data.

In this way, the fore-scattering data in combination with the backscattering data are acquired, which can be use to reduce detection dead angles, and thus the detection of the internal information on the opposite side of the ray source can be optimized; the fore-scattering data in combination with the transmission data are acquired, and thus a simultaneous detection of high-density and low-density substances can be realized; the fore-scattering data, the backscattering data and the transmission data can be taken into comprehensive consideration, and thus a simultaneous detection of high-density and low-density substances can be realized while the detection dead angles can be reduced. In this way, the detection effect of the object to be detected is optimized and the detection accuracy is improved.

In an embodiment, rays are emitted to the object to be detected by using a ray emitter that alternately emits a fan beam of rays and a flying spot beam of rays. In such a method, on the one hand, the emission of two kinds of beams of rays can be realized by using a single ray emitter, and thus the volume of the security inspection equipment can be reduced, and on the other hand, the transmission data and the scattering data can be simultaneously acquired, and thus the detection speed can be increased and the detection effect can be optimized.

In an embodiment, a detection image can be displayed according to the detection information, and the operator may be alerted by marking a prohibited object in the object to be detected or by alarming according to the detection information. During the detection, the operator can monitor the detection image, manipulate and command remotely. In such a method, detection results can be real-time processed and timely displayed, which is convenient for the usage of operator and the security can be improved.

It should be finally noted that, the above embodiments are merely used for describing the technical solutions of the present disclosure but not for limiting them; although the present disclosure is described in detail with reference to preferred embodiments, those skilled in the art should appreciate that, modifications or equivalent substitutions for partial technical features still can be made according to the embodiments of the present disclosure, without departing from the spirit of the technical solutions of the present disclosure, and all these modifications and substitutions should fall within the scope of the technical solutions sought to be protected in the present disclosure.

The invention claimed is:

1. A security inspection equipment comprising:
   a ray emitter which comprises a ray source and a space modulator, wherein:
     the ray source locates at a center of the ray emitter; and
     the space modulator comprises:
       a fixed shielding plate located between the ray source and the backscatter detector, which causes the rays emitted by the ray source to emit in a predetermined direction with a predetermined angle, and
       a rotary shield around the ray source and the fixed shielding plate, wherein the rotary shield rotates around the ray source at a predetermined rate, and comprises more than one slot and more than one throughhole; and
   a radiation detector comprising a forescatter detector, the forescatter detector and the ray emitter located on opposite sides of an object to be detected; wherein the radiation detector further comprises at least one of the following detectors:
     a backscatter detector located between the ray emitter and the object to be detected; or
     a transmission detector wherein the transmission detector and the ray emitter located on opposite sides of an object to be detected.

2. The security inspection equipment according to claim 1, wherein the ray emitter is used for emitting a fan beam of rays and a flying spot beam of rays.

3. The security inspection equipment according to claim 1, wherein the transmission detector comprises a plurality of detector modules, wherein an angle of placement of each of the detector modules is adapted to a ray incident direction depending on a location of the each detector module in the transmission detector.

4. The security inspection equipment according to claim 3, wherein the angle of placement of the detector module adapted to a ray incident direction comprises: a detection surface of the detector module is perpendicular to the ray incident direction.

5. The security inspection equipment according to claim 3, wherein,
   the transmission detector comprises a plurality of detector units consisting of a predetermined number of detector modules arranged in parallel;
   the angle of placement of each of the detector modules adapted to the ray incident direction depending on a different location of each of the detector modules in the transmission detector comprising: depending on a location of each of the detector units in the transmission detector, a direction of the detection surface of the each detector unit is adapted to the ray incident direction.

6. The security inspection equipment according to claim 3, wherein the transmission detector is of an arc shape protruding toward an opposite side of the object to be detected or of a flat plate shape.

7. The security inspection equipment according to claim 1, further comprising a transportation facility for carrying and moving the ray emitter and the radiation detector.

8. The security inspection equipment according to claim 7, further comprising a cantilever, one end of the cantilever connected to the transmission detector and the forescatter detector, and the other end of the cantilever connected to the transportation facility;
wherein, the transportation facility carries the ray emitter inside and a side surface of the transportation facility is connected to the backscatter detector.

9. The security inspection equipment according to claim 8, wherein the cantilever comprises a folding mechanism and a rotating mechanism for folding and rotating the cantilever.

10. The security inspection equipment according to claim 9, further comprising a controller configured to control folding and rotation of the cantilever.

11. The security inspection equipment according to claim 1, further comprising a processor configured to receive detection signals from the forescatter detector, the backscatter detector, and the transmission detector, and analyze the objects to be detected.

12. A ray detection method comprising:
emitting a fan beam of rays and a flying spot beam of rays to an object to be detected by using a ray emitter which comprises a ray source and a space modulator, wherein:
the ray source locates at a center of the ray emitter; and
the space modulator comprises:
a fixed shielding plate, located between the ray source and the backscatter detector, which causes the rays emitted by the ray source to emit in a predetermined direction with a predetermined angle, and
a rotary shield around the ray source and the fixed shielding, wherein the rotary shield rotates around the ray source at a predetermined rate, and comprises more than one slot and more than one throughhole;
acquiring detection data by a radiation detector comprising:
acquiring fore-scattering data of the object to be detected by a forescatter detector; and
at least one of following two steps: acquiring transmission data of the object to be detected by a transmission detector; or acquiring backscattering data of the object to be detected by a backscatter detector; and
acquiring detection information based on the fore-scattering data, and at least one of the backscattering data or the transmission data.

13. The method according to claim 12, wherein emitting a fan beam of rays and a flying spot beam of rays to an object to be detected by using a ray emitter comprises:
emitting rays to the object to be detected by using a ray emitter which alternately emits a fan beam of rays and a flying spot beam of rays.

14. The method according to claim 13, further comprising at least one of the following steps:
displaying a detection image according to the detection information; or
marking a prohibited object in the object to be detected or alarming according to the detection information.

* * * * *